(12) United States Patent
Kuroishi et al.

(10) Patent No.: US 10,630,783 B2
(45) Date of Patent: Apr. 21, 2020

(54) TERMINAL MANAGEMENT APPARATUS, TERMINAL MANAGEMENT SYSTEM, AND NON-TRANSITORY COMPUTER READABLE MEDIUM

(71) Applicant: FUJI XEROX CO., LTD., Tokyo (JP)

(72) Inventors: Kenji Kuroishi, Kanagawa (JP); Chigusa Nakata, Kanagawa (JP); Hiroshi Honda, Kanagawa (JP); Eiji Nishi, Kanagawa (JP); Yoshihiro Sekine, Kanagawa (JP); Hiroshi Mikuriya, Kanagawa (JP); Takeshi Furuya, Kanagawa (JP); Ryuichi Ishizuka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 169 days.

(21) Appl. No.: 15/730,951

(22) Filed: Oct. 12, 2017

(65) Prior Publication Data
US 2018/0219952 A1 Aug. 2, 2018

(30) Foreign Application Priority Data
Feb. 1, 2017 (JP) .................................. 2017-017015

(51) Int. Cl.
*G06F 15/16* (2006.01)
*H04L 29/08* (2006.01)
(Continued)

(52) U.S. Cl.
CPC ............ *H04L 67/141* (2013.01); *H04L 67/16* (2013.01); *H04L 69/14* (2013.01); *H04W 48/16* (2013.01); *H04W 76/15* (2018.02)

(58) Field of Classification Search
CPC ....... H04L 67/141; H04L 67/16; H04L 69/14; H04W 76/15; H04W 48/16
(Continued)

(56) References Cited

U.S. PATENT DOCUMENTS

| 9,503,893 | B2 | 11/2016 | Negishi et al. |
| 2013/0138824 | A1* | 5/2013 | Yoshino ................ H04L 67/141 709/228 |
| 2016/0004497 | A1* | 1/2016 | Nishi ..................... H04W 76/15 358/1.15 |

FOREIGN PATENT DOCUMENTS

| JP | 2015-119457 A | 6/2015 |
| JP | 2016-021654 A | 2/2016 |

* cited by examiner

*Primary Examiner* — Normin Abedin
(74) *Attorney, Agent, or Firm* — Sughrue Mion, PLLC

(57) ABSTRACT

A terminal management apparatus includes a first connection unit, a second connection unit, a setup information management unit, and a communication controller. The first connection unit is connectable to a terminal apparatus via a wireless communication link. The terminal apparatus serves as a target being managed. The second connection unit is connectable to the terminal apparatus via at least one of a wireless communication link and a wired communication line using a connection path different from a connection path used by the first connection unit. The setup information management unit obtains and manages setup information used for establishing a connection with the terminal apparatus, from the terminal apparatus via the first connection unit. The communication controller connects to the terminal apparatus via the second communication unit using identification information of the terminal apparatus managed by the setup information management unit, and communicates with the terminal apparatus.

6 Claims, 6 Drawing Sheets

(51) Int. Cl.
*H04W 48/16* (2009.01)
*H04W 76/15* (2018.01)
*H04L 29/06* (2006.01)

(58) Field of Classification Search
USPC .......................................................... 709/227
See application file for complete search history.

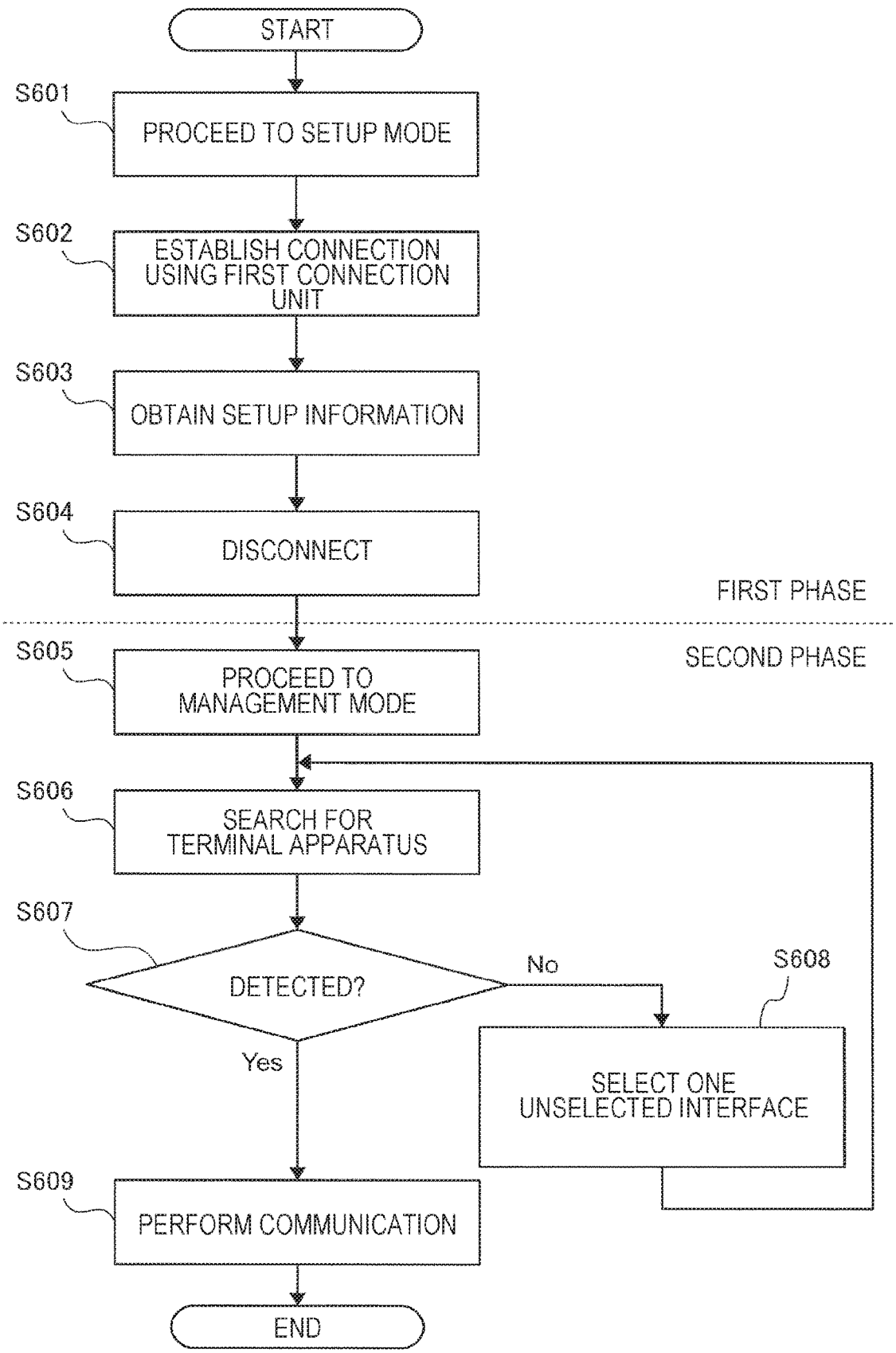

TERMINAL MANAGEMENT APPARATUS, TERMINAL MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-017015 filed Feb. 1, 2017.

BACKGROUND

(i) Technical Field

The present invention relates to a terminal management apparatus, a terminal management system, and a non-transitory computer readable medium.

(ii) Related Art

To exchange data among multiple apparatuses connected via a network, authentication is performed between the apparatuses.

Various electronic devices provided with a communication function are used to collect information obtained by sensors via a network or to control actuators of the electronic devices. However, it takes many tasks to setup authentication (pairing) for connecting a huge number of electronic devices with a server that is in charge of collecting information and performing control.

SUMMARY

According to an aspect of the invention, there is provided a terminal management apparatus including a first connection unit, a second connection unit, a setup information management unit, and a communication controller. The first connection unit is connectable to a terminal apparatus via a wireless communication link. The terminal apparatus serves as a target being managed. The second connection unit is connectable to the terminal apparatus via at least one of a wireless communication link and a wired communication line using a connection path different from a connection path used by the first connection unit. The setup information management unit obtains and manages setup information used for establishing a connection with the terminal apparatus, from the terminal apparatus via the first connection unit. The communication controller connects to the terminal apparatus via the second communication unit using identification information of the terminal apparatus managed by the setup information management unit, and communicates with the terminal apparatus.

BRIEF DESCRIPTION OF THE DRAWINGS

An exemplary embodiment of the present invention will be described in detail based on the following figures, wherein:

FIG. 4A illustrates a connection situation under control of a first connection controller, and FIG. 4B illustrates a connection situation under control of a second connection controller;

FIG. 6 is a flowchart illustrating the operation of the controller of the management server.

DETAILED DESCRIPTION

Hereinafter, an exemplary embodiment of the present invention will be described in detail with reference to the accompanying drawings.

System to which Exemplary Embodiment is Applied

Figure 1:
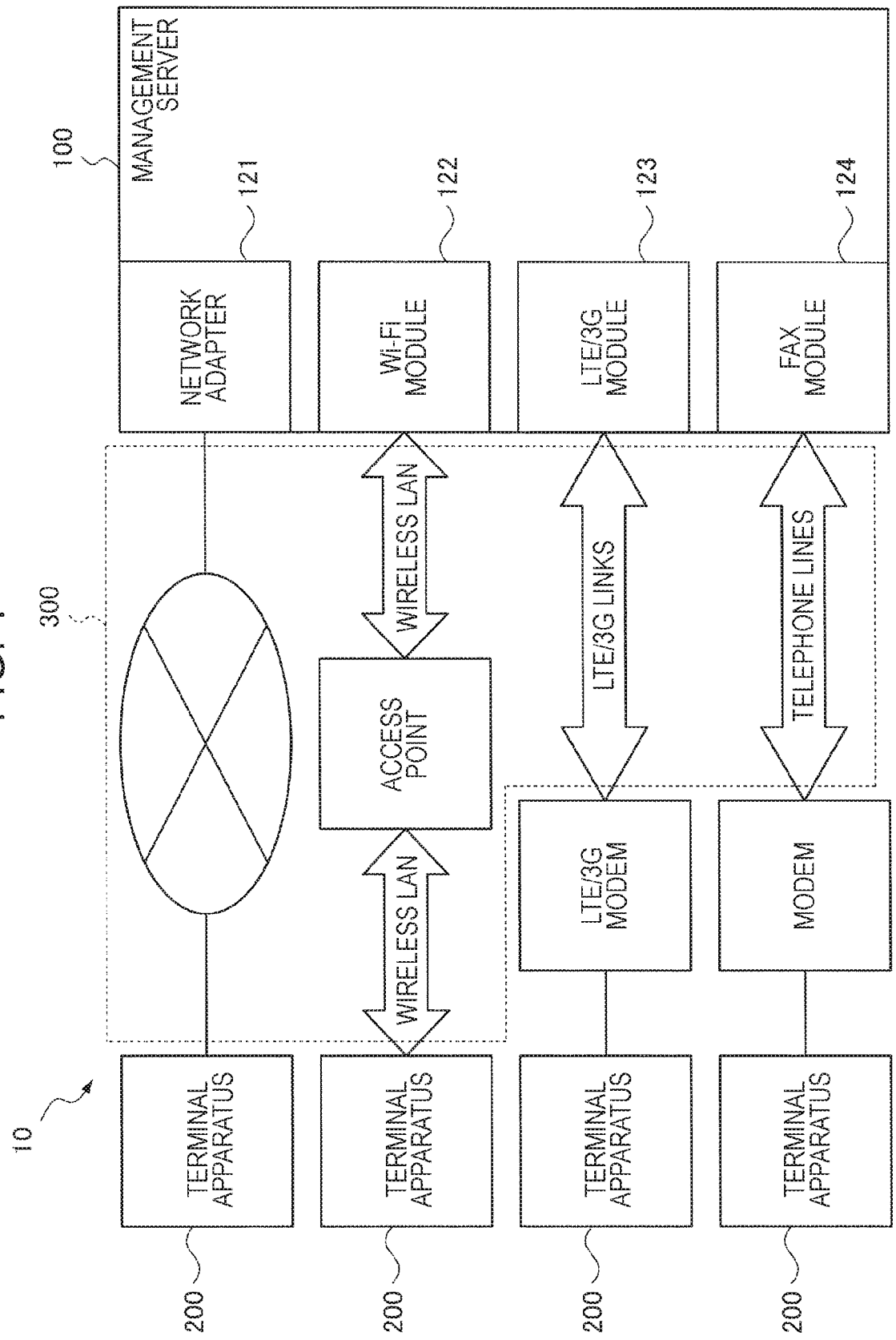
FIG. 1 is a diagram illustrating the overall configuration of a terminal management system according to an exemplary embodiment.

FIG. 1 is a diagram illustrating the overall configuration of a terminal management system according to the exemplary embodiment. A terminal management system 10 illustrated in FIG. 1 includes a management server 100, and terminal apparatuses 200, which are targets being managed. The management server 100 and the terminal apparatuses 200 are connected via a network 300. Although not illustrated in FIG. 1, the management server 100 itself may be connected to another server (external server) via the network 300. In this case, the management server 100 functions as a so-called edge server in an information system including other servers on a network.

The management server 100 is an example of a terminal management apparatus that manages the terminal apparatuses 200. The management server 100 is realized by various information processing apparatuses with a communication function, in addition to personal computers and server machines. In the exemplary embodiment, for example, the case will be described in which an image processing apparatus which is namely a multifunctional peripheral that is provided with a photocopy function, an image reading function, a print function, and a FAX communication function, and that is additionally provided with a communication function for connecting to the network 300 is used as the management server 100.

The management server 100 manages the terminal apparatuses 200, receives information from the terminal apparatuses 200, and transmits control commands to the terminal apparatuses 200. The management server 100 has multiple network interfaces for connecting to network links of multiple types. In the example illustrated in FIG. 1, a network adapter 121 for connecting to a local area network (LAN) using wired communication, a Wi-Fi (registered trademark) module 122 for connecting to a LAN using wireless communication, a Long-Term Evolution (LTE)/3rd Generation (3G) module 123 for connecting to LTE and 3G links (hereinafter referred to as LTE/3G links) used in cellular phones, and a FAX module 124 for connecting to FAX communication lines (telephone lines) are provided.

The terminal apparatuses 200 are electronic devices with a communication function for performing communication via the network 300. Specific examples of the terminal apparatuses 200 are the so-called Internet of Things (IoT) devices. Each terminal apparatus 200 has, for example, a sensor serving as an information obtaining unit, and, using the communication function, transmits information obtained by the sensor to the management server 100 via the network 300. Each terminal apparatus 200 also has an actuating unit such as an actuator or a light-emitting unit, and the actuating unit is operated in accordance with control commands received from the management server 100 via the network 300.

Although the exemplary embodiment assumes a configuration where the multiple terminal apparatuses 200 are managed by the management server 100, it is not necessary for the terminal apparatuses 200 to include the same type of information obtaining unit and actuating unit, and the terminal apparatuses 200 may include different information obtaining units and different actuating units. It is also not necessary for each terminal apparatus 200 to include both the information obtaining unit and the actuating unit, and each terminal apparatus 200 may include only one of the information obtaining unit and the actuating unit. Alternatively, each terminal apparatus 200 may include multiple types of information obtaining units or multiple types of actuating units.

In the exemplary embodiment, the terminal apparatuses 200 are installed at various locations in accordance with information to obtain and the details of operation to conduct. Therefore, the physical positional relationship between the management server 100 and each terminal apparatus 200 varies from one to another. A communication link for connecting the management server 100 and each terminal apparatus 200 is selected in accordance with the type (model) of the terminal apparatus 200 and the location where the terminal apparatus 200 is installed.

The network 300 is not particularly restricted unless it is a communication network used in data communication between the management server 100 and the terminal apparatuses 200. Examples of the network 300 include a LAN, a wide area network (WAN), and the Internet. A communication link used in data communication is not limited to wired or wireless, as has been described above, and various links may be employed. The apparatuses may be connected to one another via multiple networks or communication links.

Configuration of Management Server

Figure 2:
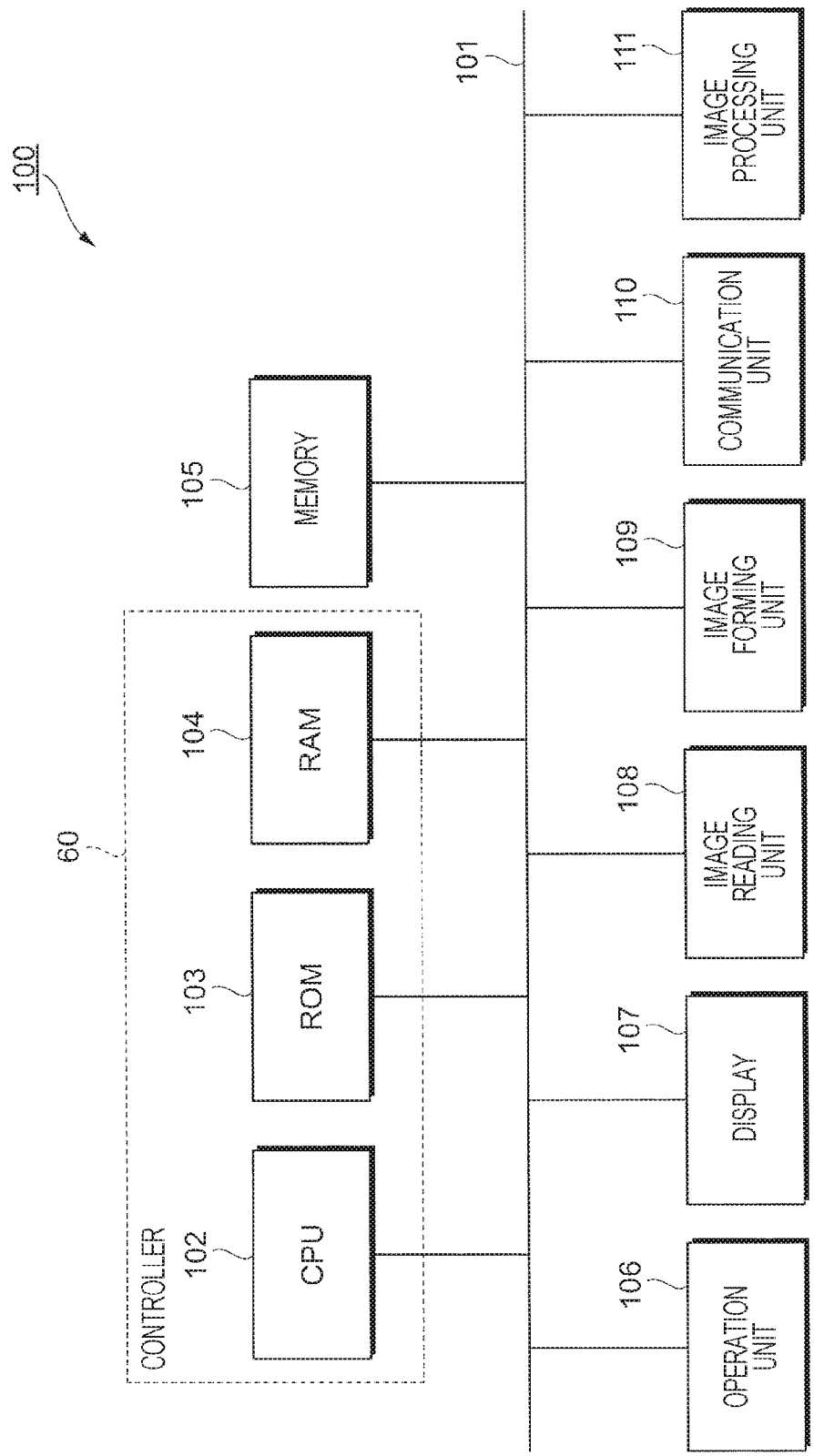
FIG. 2 is a diagram illustrating the functional configuration of a multifunctional peripheral serving as an example of a management server.

FIG. 2 is a diagram illustrating the functional configuration of a multifunctional peripheral serving as an example of the management server 100. In the configuration illustrated in FIG. 2, the management server 100 includes a central processing unit (CPU) 102 configuring a controller 60, read-only memory (ROM) 103, and random-access memory (RAM) 104. The management server 100 additionally includes memory 105, an operation unit 106, a display 107, an image reading unit 108, an image forming unit 109, a communication unit 110, and an image processing unit 111. These functional units are connected to a bus 101 and exchange data via the bus 101.

The operation unit 106 receives an operation performed by a user. The operation unit 106 includes, for example, a hardware key. The operation unit 106 also includes, for example, a touch sensor that outputs a control signal in accordance with a pressed position. The touch sensor and a liquid crystal display (LCD) configuring the later-described display 107 may be combined to configure a touchscreen.

The display 107 is an example of a display, and includes, for example, an LCD. The display 107 displays information regarding the management server 100 under control of the CPU 102. The display 107 additionally displays a menu screen to which the user refers when the user operates the management server 100. That is, the above-mentioned operation unit 106 and the display 107 may be combined to function as a user interface unit of the management server 100.

The image reading unit 108 includes a so-called scanner device. The image reading unit 108 optically reads an image on a set document and generates a read image (image data). The image reading method uses, for example, a charge coupled device (CCD) system where reflected light of light emitted from a light source to a document is reduced in size by a lens and received by CCDs, or a contact image sensor (CIS) system where reflected light of light beams emitted sequentially from light-emitting diode (LED) light sources to a document is received by CIS.

The image forming unit 109 is an example of an image forming unit. The image forming unit 109 forms an image based on image data using an image forming material on paper which is an example of a recording material. As the system of forming an image on a recording materiel, for example, an electrophotographic system that transfers toners attached to a photoconductor to a recording medium to form an image, or an inkjet system that discharges ink onto a recording medium to form an image is used.

The communication unit 110 has a network interface for connecting to each terminal apparatus 200 via the network 300. Though not illustrated in the drawings, as has been described with reference to FIG. 1, the network adapter 121, the Wi-Fi module 122, the LTE/3G module 123, and the FAX module 124 are provided as examples of the network interface. A module for connecting to each terminal apparatus 200 using short-distance wireless communication such as near-field radio communication (NFC) or Bluetooth (registered trademark) may be provided as the communication unit 110.

The image processing unit 111 includes a processor serving as an arithmetic operation unit and work memory, and applies image processing such as color correction or tone correction to an image represented by image data. The CPU 102 of the controller 60 may also serve as the processor, and the RAM 104 of the controller 60 may also serve as the work memory.

The memory 105 is an example of memory, and includes, for example, a storage device such as a hard disk drive (HDD). The memory 105 stores image data such as a read image generated by the image reading unit 108. Furthermore, the memory 105 of the exemplary embodiment stores information for connecting the management server 100 and each terminal apparatus 200.

Among the CPU 102, ROM 103, and RAM 104 configuring the controller 60, the ROM 103 stores a program executed by the CPU 102. The CPU 102 reads the program stored in the ROM 103, and, using the RAM 104 as a work area, executes the program. Alternatively, a program stored in the memory 105 may be loaded to the RAM 104, and the program loaded on the RAM 104 may be executed by the CPU 102. In response to execution of the program by the CPU 102, the above-described functional units of the management server 100 are controlled, and the following functions are realized.

Here, the program executed by the CPU 102 may be provided to the management server 100 in a state where the program is recorded on a computer-readable recording medium such as a magnetic recording medium (including a magnetic disk), an optical recording medium (including an optical disk), and semiconductor memory. Alternatively, the program executed by the CPU 102 may be provided to management server 100 via a network such as the Internet.

Functional Configuration of Controller

Figure 3:
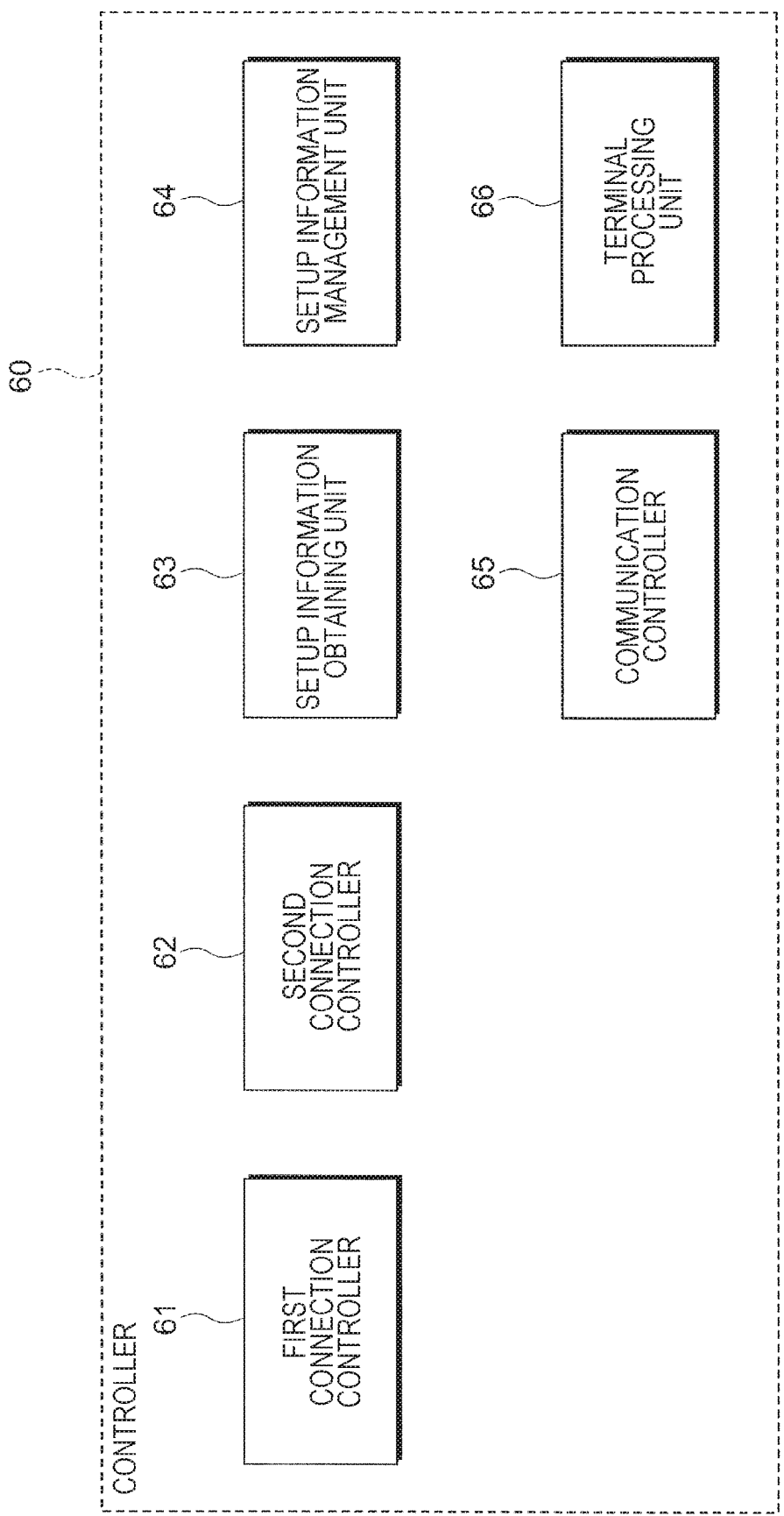
FIG. 3 is a diagram illustrating the functional configuration of a controller.

FIG. 3 is a diagram illustrating the functional configuration of the controller 60. In the controller 60, cooperation between software and hardware resources realizes the following functions as illustrated in FIG. 3: a first connection controller 61, a second connection controller 62, a setup information obtaining unit 63, a setup information management unit 64, a communication controller 65, and a terminal processing unit 66.

The first connection controller 61 connects to a terminal apparatus 200 via a wireless communication link using the interface of the communication unit 110 of the management server 100. That is, the first connection controller 61 and the communication unit 110 are an example of a management-apparatus-side first connection unit for connecting to a terminal apparatus 200 using wireless communication. Here, the connection with the terminal apparatus 200 established by the first connection controller 61 uses a communication system that performs the setup for connection without involving an operator's input operation, such as specification of a connection destination and exchange of security information. Wi-Fi Direct (registered trademark), for example, may be used as a specific example for realizing the communication system. Wi-Fi Direct is a standard for performing communication based on the Wi-Fi standard without using an access point of a wireless LAN, and the setup for communication is performed in accordance with Wi-Fi Protected Setup (WPS) (registered trademark). Therefore, using Wi-Fi Direct, the management server 100 and the terminal apparatus 200 are directly connected without using an access point of a wireless LAN or involving an operator to manually perform the setup for communication.

A specific example for realizing the communication system for connecting the management server 100 and the terminal apparatus 200 under control of the first connection controller 61 is not limited to Wi-Fi Direct. Even in the case of a normal wireless LAN connection via an access point of a wireless LAN, the use of WPS allows the management server 100 and the terminal apparatus 200 to be connected without involving an operator's manual operation. Additionally, the use of a peer to peer (P2P) communication function of NFC allows the management server 100 and the terminal apparatus 200 to be connected without involving an operator's manual operation. Furthermore, the first connection controller 61 may cope with multiple communication systems that are usable in establishing a connection with the terminal apparatus 200.

The second connection controller 62 connects to a terminal apparatus 200 via any communication link usable by the management server 100 using the interface of the communication unit 110. That is, the second connection controller 62 and the communication unit 110 are an example of a management-apparatus-side second connection unit for connecting to a terminal apparatus 200. A connection between the management server 100 and the terminal apparatus 200 under control of the second connection controller 62 is established on the basis of information for the setup for connection (hereinafter referred to as setup information) obtained by the later-described setup information obtaining unit 63.

Figure 4A:
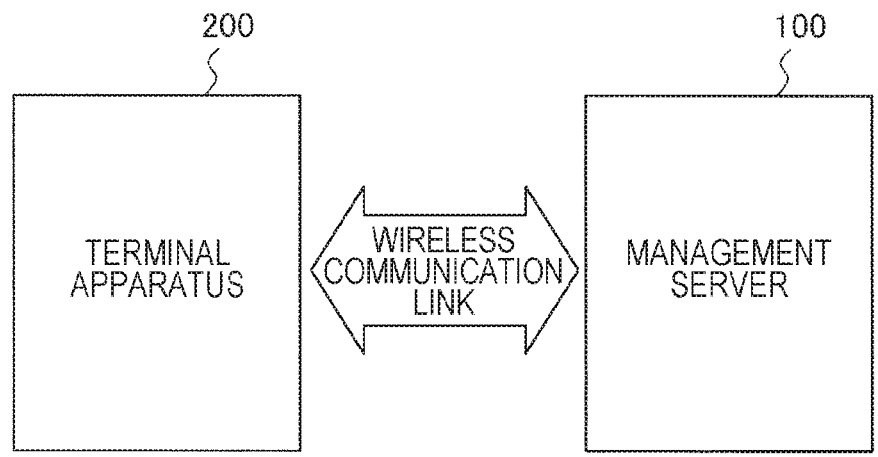
FIGS. 4A and 4B are diagrams illustrating exemplary connection situations between the management server and a terminal apparatus, that is.
Figure 4B:
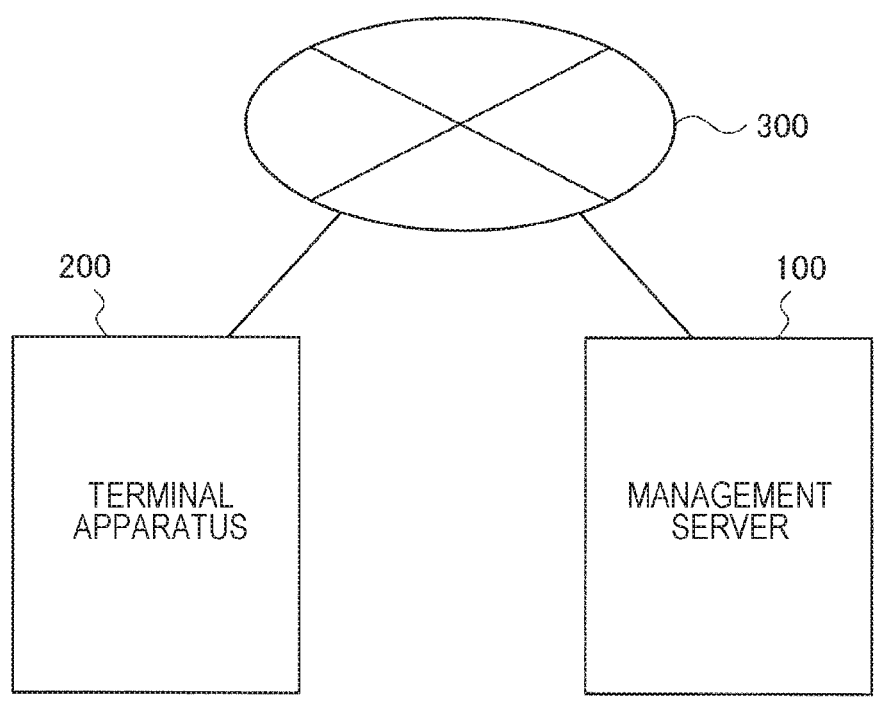

FIGS. 4A and 4B are diagrams illustrating exemplary connection situations between the management server 100 and a terminal apparatus 200, that is, FIG. 4A illustrates a connection situation under control of the first connection controller 61, and FIG. 4B illustrates a connection situation under control of the second connection controller 62. As illustrated in FIG. 4A, when Wi-Fi Direct or NFC is used to establish a connection under control of the first connection controller 61, the management server 100 and the terminal apparatus 200 are directly connected, not through the network 300. In contrast, as illustrated in FIG. 4B, in a connection established under control of the second connection controller 62, the management server 100 and the terminal apparatus 200 are connected via the network 300.

The setup information obtaining unit 63 obtains setup information necessary for connecting to the terminal apparatus 200 under control of the second connection controller 62. The setup information includes information obtained from the terminal apparatus 200 connected under control of the first connection controller 61, and information input by an operator by operating the operation unit 106 of the management server 100. The setup information includes the media access control (MAC) address and the Internet Protocol (IP) address of the terminal apparatus 200, the service set identifier (SSID) of an access point in the case where the terminal apparatus 200 connects to a wireless LAN, and information on a link used when establishing a connection under control of the second connection controller 62. The MAC address, IP address, and SSID are information used for identifying the terminal apparatus 200 on the network 300. The MAC address is obtained from the terminal apparatus 200 connected under control of the first connection controller 61. The IP address and SSID may be obtained from the terminal apparatus 200 when the terminal apparatus 200 stores them, or may be obtained by receiving an operation input from an operator. Note that the IP address is determined by identifying the network 300 to which the terminal apparatus 200 is connected, and the SSID is determined by identifying a wireless LAN (network 300) to which the terminal apparatus 200 is connected. A link used for establishing a connection under control of the second connection controller 62 is obtained by receiving an input operation from an operator. The operator refers to, for example, a setup screen displayed on the display 107 of the management server 100, selects a link to use from among links usable for connection between the management server 100 and the terminal apparatus 200, and operates the operation unit 106 to set the link. Note that all of these items of information need not be obtained, and only one or more items of obtainable information may be obtained.

The setup information management unit 64 stores the setup information obtained by the setup information obtaining unit 63 in memory such as the memory 105 or the RAM 104, and manages the setup information. The setup information management unit 64 reads from the above-described memory the setup information of a terminal apparatus 200 serving as a connection partner when the management server 100 connects to the terminal apparatus 200 under control of the second connection controller 62, and sends the read setup information to the second connection controller 62. That is, the setup information obtaining unit 63 and the setup information management unit 64 are an example of a setup information management unit that manages setup information obtained when a connection with the terminal apparatus 200 is established under control of the first connection controller 61.

The communication controller 65 controls communication performed with the terminal apparatus 200 connected under control of the second connection controller 62. Specifically, the communication controller 65 receives information received by the terminal apparatus 200 using the information obtaining unit, or transmits a control command for controlling the actuating unit of the terminal apparatus

200. The communication controller 65 stores and holds the received information in memory such as the memory 105 or the RAM 104. When there is an external server that executes a process using the received information (information held in the memory), the communication controller 65 additionally transmits the received information to the external server. When there is an external server that controls the terminal apparatus 200, the communication controller 65 receives a control command from the external server, and transmits the control command to the terminal apparatus 200 serving as a target being controlled.

The terminal processing unit 66 performs a process based on information received by the communication controller 65 from the terminal apparatus 200. For example, the terminal processing unit 66 aggregates and analyzes the received information on the basis of a predetermined rule. The terminal processing unit 66 generates a control command on the basis of the received information and the predetermined rule, and transmits the control command to the terminal apparatus 200. The details of a process performed by the terminal processing unit 66 are not particularly restricted. The terminal processing unit 66 may execute a distributed process in cooperation with an external server.

Functional Configuration of Terminal Apparatus

Figure 5:
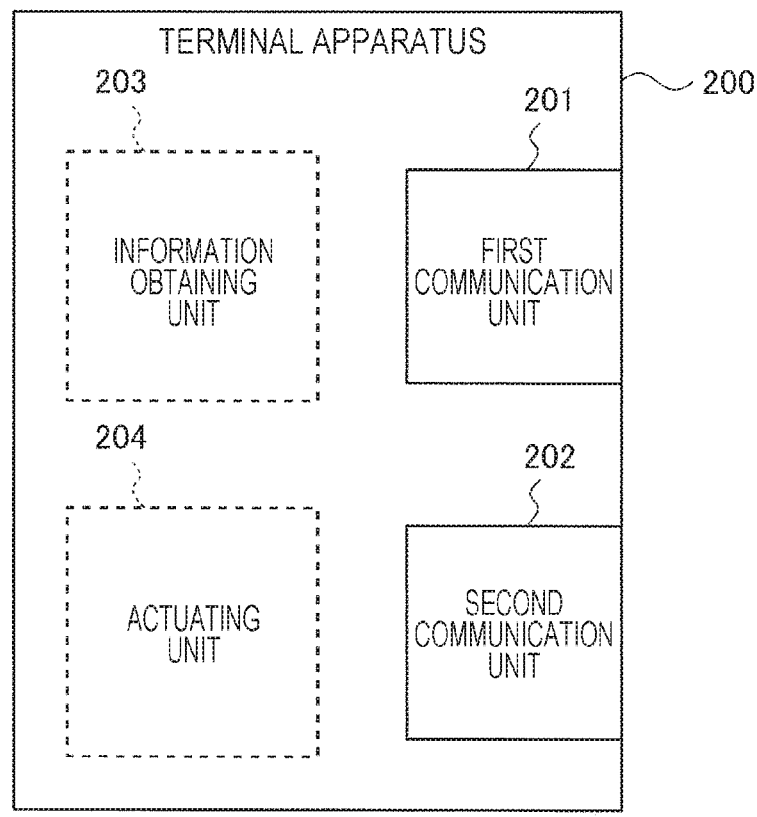
FIG. 5 is a diagram illustrating the functional configuration of the terminal apparatus.

FIG. 5 is a diagram illustrating the functional configuration of each terminal apparatus 200. As illustrated in FIG. 5, the terminal apparatus 200 includes a first communication unit 201, which is for connecting to the management server 100 via a wireless communication link, and a second communication unit 202, which is for connecting to the management server 100 separately from the first communication unit 201. The terminal apparatus 200 includes at least one of an information obtaining unit 203 and an actuating unit 204. As described above, the type and number of the information obtaining unit 203 and the actuating unit 204 are not particularly restricted, and the terminal apparatus 200 may be configured to include only one of the information obtaining unit 203 and the actuating unit 204.

The first communication unit 201 has a wireless communication interface, and connects to the management server 100 in communication established under control of the first connection controller 61 of the management server 100. That is, the first communication unit 201 is an example of a terminal-apparatus-side first connection unit corresponding to the management-apparatus-side first connection unit of the management server 100. Therefore, if a connection established under control of the first connection controller 61 is one that uses Wi-Fi Direct, the first communication unit 201 is also provided with a communication unit in accordance with the standard of Wi-Fi Direct.

The second communication unit 202 has a wired or wireless communication interface, and connects to the management server 100 in communication established under control of the second connection controller 62 of the management server 100. That is, the second communication unit 202 is an example of a terminal-apparatus-side second connection unit corresponding to the management-apparatus-side second connection unit of the management server 100. When the terminal apparatus 200 is an apparatus that includes the information obtaining unit 203, the second communication unit 202 transmits information obtained by the information obtaining unit 203 to the management server 100. When the terminal apparatus 200 is an apparatus that includes the actuating unit 204, the second communication unit 202 transmits a control command received from the management server 100 to a controller (not illustrated) of the actuating unit 204.

Connection Operation of Management Server and Terminal Apparatus

FIG. 6 is a flowchart illustrating the operation of the controller 60 (first connection controller 61, second connection controller 62, and setup information obtaining unit 63) of the management server 100. In the present embodiment, a connection between the management server 100 and the terminal apparatus 200 includes a first phase where the management server 100 obtains setup information, and a second phase where the management server 100 manages the terminal apparatus 200. In the operation illustrated in FIG. 6, steps S601 to S604 correspond to the first phase, and steps S605 to 609 correspond to the second phase. In the first phase, a connection is established under control of the first connection controller 61. In the second phase, a connection is established under control of the second connection controller 62. The connection between the management server 100 and the terminal apparatus 200 is disconnected once when switching from the first phase to the second phase.

In the first phase, authentication setup is performed between the management server 100 and the terminal apparatus 200. In view of a communication system used in the first phase, the management server 100 and the terminal apparatus 200 are located at positions (distance) such that a connection may be physically established under control of the first connection controller 61. In contrast, in the second phase, because the terminal apparatus 200 is actually operated, the terminal apparatus 200 is installed at various locations in accordance with information to obtain and/or the details of the operation to conduct. That is, after communication is performed in the first phase, the terminal apparatus 200 is moved to a location where the terminal apparatus 200 is actually operated. At this time, the connection between the management server 100 and the terminal apparatus 200 is disconnected.

As illustrated in FIG. 6, at first, the operator performs a mode switching operation by operating the operation unit 106 of the management server 100, and the operation mode of the management server 100 becomes a setup mode for performing the authentication setup of the terminal apparatus 200 (S601). Under control of the first connection controller 61 (using the first connection unit), the management server 100 and the terminal apparatus 200 are connected (S602). A specific connection procedure is identified in accordance with a communication system used in establishing a connection under control of the first connection controller 61. For example, when Wi-Fi Direct (WPS) is used, at first the Wi-Fi Direct function of both the management server 100 and the terminal apparatus 200 is turned ON (activated). Specifically, the management server 100 selects a connection using Wi-Fi Direct on a menu screen displayed on the display 107. In accordance with the apparatus configuration, the terminal apparatus 200 enters a state where a connection using Wi-Fi Direct may be established in a power ON state or in response to operating a setup switch or the like. Alternatively, when NFC is used to establish a connection under control of the first connection controller 61, a connection is established by arranging an NFC communication module of the management server 100 and an NFC communication module of the terminal apparatus 200 at positions (at a distance) where communication starts.

When the management server 100 and the terminal apparatus 200 are connected under control of the first connection controller 61, the setup information obtaining unit 63 receives, out of the setup information, information that may be obtained from the terminal apparatus 200 (S603). The received information is stored in the memory of the management server 100. When the operator performs an input operation as necessary and the obtaining of the setup information is completed, the first connection controller 61 disconnects the connection with the terminal apparatus 200 (S604). Disconnection of the connection under control of the first connection controller 61 may be performed under control of the first connection controller 61, or may be performed by turning OFF the power of the terminal apparatus 200 or the management server 100. After the connection between the management server 100 and the terminal apparatus 200 is disconnected, the terminal apparatus 200 is installed at a location where the terminal apparatus 200 will be operated.

Next, the operator performs a mode switching operation by operating the operation unit 106 of the management server 100, and the operation mode of the management server 100 proceeds from the setup mode to a management mode for managing the terminal apparatus 200 (S605). Under control of the second connection controller 62, an attempt is made to connect the management server 100 and the terminal apparatus 200. The second connection controller 62 first receives, out of the setup information managed by the setup information management unit 64, the setup information of the terminal apparatus 200 to be connected, and, on the basis of this setup information, searches for the terminal apparatus 200 on the network 300 (S606). Here, when the to-be-used link is identified in the setup information, initially the second connection controller 62 searches for the terminal apparatus 200 using an interface indicated in the setup information. Alternatively, when the to-be-used link is not identified in the setup information, the second connection controller 62 searches for the terminal apparatus 200 by selecting one of the interfaces included in the communication unit 110 of the management server 100. At this time, the interface that is selected first may be determined in advance in accordance with the specification and/or the operating environment of the terminal management system 10.

When the to-be-connected terminal apparatus 200 is not detected (NO in S607), the second connection controller 62 selects one of the unselected interfaces among the interfaces included in the communication unit 110 of the management server 100 (S608), and again searches for the terminal apparatus 200 (S606). At this time, the interface selecting order may be determined in advance in accordance with the specification and/or the operating environment of the terminal management system 10.

When the to-be-connected terminal apparatus 200 is detected (YES in S607), the second connection controller 62 performs communication with the terminal apparatus 200 using the interface and communication link used when the terminal apparatus 200 is detected (S609). From this time onward, when the connection between the management server 100 and the terminal apparatus 200 is disconnected on the basis of the operating environment of the management server 100 and the terminal apparatus 200, a search is conducted using the interface and communication link used when the disconnected terminal apparatus 200 has been detected, and an attempt is made again to establish a connection. Furthermore, if the connection using the interface and communication link connected so far becomes disconnected, another interface and communication link may be selected to perform the operation from step S606 onward, and a search for the terminal apparatus 200 may be conducted.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal management apparatus comprising:
    a first connection unit that is connectable to a terminal apparatus via a wireless communication link, the terminal apparatus serving as a target being managed;
    a second connection unit that is connectable to the terminal apparatus via a wired communication line using a connection path different from a connection path used by the first connection unit;
    a setup information management unit that obtains and manages setup information used for establishing a connection with the terminal apparatus, from the terminal apparatus via the first connection unit; and
    a communication controller that connects to the terminal apparatus via the second communication unit using identification information of the terminal apparatus managed by the setup information management unit, and communicates with the terminal apparatus,
    wherein the second connection unit includes a communication function based on a plurality of communication systems of different types,
    wherein, when the setup information obtained by the setup information management unit includes information that identifies a to-be-used communication system, the second connection unit searches for the terminal apparatus using the communication system,
    wherein, when the terminal apparatus is not detected by the search based on the setup information, or when the setup information obtained by the setup information obtaining unit includes no information that identifies a to-be-used communication system, the second connection unit selects a communication system in a predetermined order that is determined in advance in accordance with a specification of the terminal management apparatus, and searches for the terminal apparatus using the selected communication system, and
    wherein the second connection unit establishes a connection using a communication system used when the terminal apparatus is detected.

2. The terminal management apparatus according to claim 1, wherein the second connection unit selects a communication system in a predetermined order when the connection with the terminal apparatus using the communication system used for establishing a connection with the terminal apparatus is disconnected, searches for the terminal apparatus using the selected communication system, and establishes a connection using a communication system used when the terminal apparatus is detected.

3. The terminal management apparatus according to claim 1, wherein the first connection unit connects to the terminal apparatus using a communication system that is connectable to the terminal apparatus not through an access point of a wireless local area network.

4. The terminal management apparatus according to claim 1, wherein a connection with the terminal apparatus is established by the second connection unit after a connection with the terminal apparatus is established by the first connection unit and the connection with the terminal apparatus established by the first connection unit is disconnected.

5. A terminal management system comprising:
a plurality of terminal apparatuses; and
a terminal management apparatus that manages the terminal apparatuses,
wherein the terminal apparatuses each include:
a terminal-apparatus-side first connection unit that is connectable to the terminal management apparatus via a wireless communication link; and
a terminal-apparatus-side second connection unit that is connectable to the terminal management apparatus via a wired communication line using a connection path that is identical to or different from a connection path used by the terminal-apparatus-side first connection unit, and
the terminal management apparatus includes:
a management-apparatus-side first connection unit that is connectable to the terminal apparatus correspondingly to the terminal-apparatus-side first connection unit of the terminal apparatus;
a management-apparatus-side second connection unit that is connectable to the terminal apparatus correspondingly to the terminal-apparatus-side second connection unit of the terminal apparatus;
a setup information management unit that obtains and manages setup information used for establishing a connection with the terminal apparatus, from the terminal apparatus via the management-apparatus-side first connection unit; and
a communication controller that connects to the terminal apparatus via the management-apparatus-side second communication unit using identification information of the terminal apparatus managed by the setup information management unit, and communicates with the terminal apparatus,
wherein the second connection unit includes a communication function based on a plurality of communication systems of different types,
wherein, when the setup information obtained by the setup information management unit includes information that identifies a to-be-used communication system, the second connection unit searches for the terminal apparatus using the communication system,
wherein, when the terminal apparatus is not detected by the search based on the setup information, or when the setup information obtained by the setup information obtaining unit includes no information that identifies a to-be-used communication system, the second connection unit selects a communication system in a predetermined order that is determined in advance in accordance with a specification of the terminal management apparatus, and searches for the terminal apparatus using the selected communication system, and
wherein the second connection unit establishes a connection using a communication system used when the terminal apparatus is detected.

6. A non-transitory computer readable medium storing a program causing a computer of a management apparatus that manages a terminal apparatus to execute a process for connecting the management apparatus and the terminal apparatus, the process comprising:
establishing a connection with the terminal apparatus by a first connection unit that is connectable to the terminal apparatus using a wireless communication link, the terminal apparatus serving as a target being managed;
obtaining setup information for connecting to the terminal apparatus via a network using the connection established by the first connection unit;
disconnecting the connection established by the first connection unit; and
establishing, on a basis of the setup information, a connection with the terminal apparatus via a network by a second connection unit that is connectable to the terminal apparatus using a wired communication line the second connection unit being different from the first connection unit and including a communication function based on a plurality of communication systems of different types;
when the obtained setup information includes information that identifies a to-be-used communication system, searching, by the second connection unit, for the terminal apparatus using the communication system,
when the terminal apparatus is not detected by the search based on the obtained setup information, or when the obtained setup information includes no information that identifies a to-be-used communication system, selecting, by the second connection unit, a communication system in a predetermined order that is determined in advance in accordance with a specification of the management apparatus, and searching, by the second connection unit, for the terminal apparatus using the selected communication system, and
establishing, by the second connection unit, a connection using a communication system used when the terminal apparatus is detected.

* * * * *